US009624381B2

(12) United States Patent
Krishnamoorthy (10) Patent No.: US 9,624,381 B2
(45) Date of Patent: Apr. 18, 2017

(54) REVERSIBLE SWITCHING BETWEEN SUPER HYDROPHOBIC AND SUPER HYDROPHILIC STATES

(71) Applicant: Council of Scientific & Industrial Research, New Delhi (IN)

(72) Inventor: Kothandam Krishnamoorthy, Pune (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 19 days.

(21) Appl. No.: 14/372,681

(22) PCT Filed: Jan. 17, 2013

(86) PCT No.: PCT/IB2013/050418
§ 371 (c)(1),
(2) Date: Jul. 16, 2014

(87) PCT Pub. No.: WO2013/108199
PCT Pub. Date: Jul. 25, 2013

(65) Prior Publication Data
US 2015/0018465 A1 Jan. 15, 2015

(30) Foreign Application Priority Data
Jan. 17, 2012 (IN) .............................. 139/DEL/2012

(51) Int. Cl.
*C09D 5/00* (2006.01)
*C09D 5/16* (2006.01)
(Continued)

(52) U.S. Cl.
CPC ................ *C09D 5/00* (2013.01); *C08K 5/175* (2013.01); *C09D 5/1687* (2013.01); *C09D 5/24* (2013.01);
(Continued)

(58) Field of Classification Search
CPC .......... C09D 5/00; C09D 5/1687; C08D 5/24; H01B 1/127; C08K 5/175
See application file for complete search history.

(56) References Cited

U.S. PATENT DOCUMENTS

2003/0142901 A1 7/2003 Lahann et al.
2011/0244046 A1 10/2011 Shen et al.
(Continued)

FOREIGN PATENT DOCUMENTS

WO  WO 2005/053836 A1  6/2005
WO  WO 2013/108199 A1  7/2013

OTHER PUBLICATIONS

International Search Report for PCT/IB2013/050418 dated Apr. 18, 2013.
(Continued)

*Primary Examiner* — John Uselding
(74) *Attorney, Agent, or Firm* — Brinks Gilson & Lione (57) ABSTRACT

The present invention disclosed herein is a reversible switching system that switches surfaces from being hydrophilic to hydrophobic and vice-versa. More particularly, the invention relates to reversible switching system comprising a positively charged conjugated polymer; a micelle and a hydrocarbon component that is affected by a potential such that the system switches from being super hydrophilic to super hydrophobic due to, the polyvalent interaction between surfactant assemblies and delocalized charges of an insoluble polymer results in surface modification of the polymer. These systems find application in antisticking coating, anticontamination coating and wicking surfaces.

13 Claims, 7 Drawing Sheets

(51) Int. Cl.
C09D 5/24 (2006.01)
H01B 1/12 (2006.01)
C08K 5/17 (2006.01)
C09D 7/12 (2006.01)

(52) U.S. Cl.
CPC ........... *C09D 7/1233* (2013.01); *H01B 1/127* (2013.01); *H01B 1/128* (2013.01)

(56) References Cited

U.S. PATENT DOCUMENTS

2011/0303531 A1 12/2011 Hunter et al.
2012/0015146 A1 1/2012 Advincula et al.

OTHER PUBLICATIONS

Lahann, J. et al., "A Reversibly Switching Surface", www.sciencemag.org Science vol. 299, 17, pp. 371-374 (Jan. 17, 2003).

Zou, J. et al. "Optical Switching of Self-Assembly and Disassembly of Noncovalently Connected Amphiphiles", American Chemical Society, *Langmuir*, 23, pp. 12791-12794, (Oct. 29, 2007).

Xu, L. et al., "Reversible Conversion of Conducting Polymer Films from Superhydrophobic to Superhydrophilic", *Angew. Chem. Int. Ed.*, 44, pp. 6009-6012, (2005).

Kim, H. et al., "Electrical-Switching between Vesicles and Micelles via Redox-Responsive Self-Assembly of Amphiphilic Rod-Coils", *J. Am. Chem. Soc.*, 133 (14), pp. 5206-5209, (Mar. 18, 2011).

Uyama, A. et al., "Reversible Photocontrol of Surface Wettability between Hydrophilic and Superhydrophobic Surfaces on an Asymmetric Diarylethene Solid Surface", *Langmuir*, 27(10), pp. 6395-6400, (Apr. 19, 2011).

Zhang, J. et al., "Reversible Superhydrophobicity to Superhydrophilicity Transition by Extending and Unloading an Elastic Polyamide Film", Macromolecular Rapid Communications, vol. 26, Issue 6, pp. 477-480 (Mar. 18, 2005).

Feldberg, S., "Reinterpretation of polypyrrole electrochemistry. Consideration of capacitive currents in redox switching of conducting polymers", *J. Am. Chem. Soc.*, 106 (17), pp. 4671-4674 (Aug. 1984).

Zhu, Y. et al, "Chemical Dual-Responsive Wettability of Superhydrophobic PANI-PAN Coaxial Nanofibers", Macromolecular Rapid Communications, vol. 28, No. 10, pp. 1135-1141 (May 16, 2007).

Zhou, X. et al., "Fabrication of superhydrophobic polyaniline films with rapidly switchable wettability", Applied Surface Science, vol. 258, No. 1, pp. 285-289, (Aug. 10, 2011).

Halldorsson, J. et al., "Surfactant-controlled shape change of organic droplets using polypyrrole", Thin Solid Films, vol. 519, No. 19, pp. 6486-6491 (Apr. 28, 2011).

Dutta, K. et al. "Reversible Assembly and Disassembly of Micelles by a Polymer That Switches between Hydrophilic and Hydrophobic Wettings", Langmuir, vol. 28, No. 26, pp. 10097-10104, (Jul. 3, 2012).

REVERSIBLE SWITCHING BETWEEN SUPER HYDROPHOBIC AND SUPER HYDROPHILIC STATES

The following specification particularly describes the invention and manner in which it is to be performed:

TECHNICAL FIELD OF INVENTION

The invention discloses a reversible switching system that switches surfaces from being hydrophilic to hydrophobic and vice-versa. Particularly, the invention relates to reversible switching system comprising a positively charged conjugated polymer; a micelle and a hydrocarbon component that is affected by a potential such that the system switches from being super hydrophilic to super hydrophobic due to the polyvalent interaction between surfactant assemblies and delocalized charges of an insoluble polymer. More particularly, the present invention relates to a process for the switching of a system from being hydrophilic to hydrophobic and vice versa. These systems find application in antisticking coating, anticontamination coating and wicking surfaces.

BACKGROUND AND PRIOR ART

Polyelectrolytes have been widely used as scaffold for rendering mechanical stability to dynamic amphiphilic assemblies (AAs) and to prepare materials with specific architecture, nanoscopic containers and surfaces with low interfacial energy. The Coulombic attraction between oppositely charged polyelectrolytes cooperative aggregation process that eventually leads to materials with structural features similar to the AAs (FIG. 1a). Furthermore, it has been found that the structural features of AAs remain unaltered upon interaction with biopolymer electrolytes having a semirigid backbone such as DNA. The common features of these polyelectrolytes are the charges, solubility in water, and coil-like structure in solution. In fact, the coil-like structure in solution permits these polyelectrolytes to adapt a new conformation and envelope the AAs (FIG. 1a).

There are couple of prior art relates to reversible switching for amphiphiles such as Article titled "Electrical Switching between Vesicles and Micelles via Redox-Responsive Self-Assembly of Amphiphilic Rod-Coils" by Hoon Kim in *J. Am. Chem. Soc.*, 2011, 133 (14), pp 5206-5209 discloses an aqueous vesicular system i.e. switchable by electric potential without addition of any chemical redox agents into the solution using redox-responsive self-assembly of an amphiphilic rod-coil molecule consisting of a tetraaniline and a poly(ethylene glycol) block, whereas optical switching of self-assembly and disassembly of noncovalently connected amphiphiles is disclosed in *Langmuir* 2007, 23, 12791-12794 by Jiong Zou et al. where a hydrophobic compound, i.e. 3C18-Azo, containing an azo head and three 18C alkyl chains to form an amphiphile by capping it with a cyclodextrin (CD) by inclusion complexation. Also Lahann J. et al. in *Science* 2003, 299, 371-374 reported the design of surfaces that exhibit dynamic changes in interfacial properties, such as wettability, in response to an electrical potential.

Superhydrophobic surfaces with water contact angles above 150° are suitable for antisticking, anticontamination, and anticorrosion technologies. Similarly, superhydrophilic materials with water contact angles below 10° have applications as a wicking material in heat pipes. Ayaka Uyama in *Langmuir*, 2011, 27 (10), pp 6395-6400 discloses, reversible topographical changes on diarylethene microcrystalline surface between the rough crystalline surface of an open-ring isomer and flat eutectic surfaces by alternate UV and visible light irradiation wherein the contact angle changes of a water droplet between 80° and 150°.

The wettability of a solid surface is strongly influenced both by its chemical composition and by its geometric structure (surface roughness). Several experiments have focused on exploiting surface roughness to engineer superhydrophobicity or superhydrophilicity. Microscale roughness features as well as nanoscale features have also been investigated.

Reversible superhydrophobicity to superhydrophilicity transition by extending and unloading an elastic polyamide film is disclosed in *Macromolecular Rapid Communications* 26, (6), pp 477-480, 2005 by Jilin Zhang whereas reversible conversion of conducting polypyrrole (ppy) films from superhydrophobic to superhydrophilic" by Dr. Xu I. in *Angewandte chemie international edition* 44, (37), 6009-6012, 2005; additionally Stephen Feldberg in *J. Am. Chem. Soc.* 1984, 106, 4671-74 reported reinterpretation of polypyrrole electrochemistry consideration of capacitive currents in redox switching of conducting polymers.

Further US2011244046 (Shen Youqing et al.) describes charge reversible polymers, peptides and their resulting colloidal particles, where charge reversal of the poly ([epsilon]-caproactone)-block-polyethyleneimine PCL-PEI/ amide micelles was determined by measuring their [zeta]-potentials at different acidities. Further the zeta potential disclosed in state of art is more than +50V and −20V, that requires more energy and also, the reusability of the said polymers are not feasible.

Further, the prior art fails to made out a simple approach that would create both chemical and structural features to show superhydrophilic and superhydrophobic nature of the surface. A surface that can switch between hydrophilic to hydrophobic will have a profound impact on preparing smart surfaces. The approach adopted so far is tedious. Till date, the work concerning such superhydrophilic to superhydrophobic switching has used patterned surfaces to increase the roughness in a calculated manner.

In view of the foregoing, there is still need in the art to provide an simple and improved system that can switch between hydrophilic to hydrophobic at lower potential, useful in antisticking coating, anticontamination coating and wicking surfaces.

OBJECTIVE OF THE INVENTION

The main objective of the invention is to provide a reversible switching system that can switch from being hydrophobic to hydrophilic and vice versa with a contact angles of <10° and >150°.

Another objective of the invention is to provide a process for the switching of a system from being hydrophobic to hydrophilic and vice versa.

SUMMARY OF THE INVENTION

The present invention provides a reversible switching system comprising a positively charged insoluble conjugated polymer; a micelle and a hydrocarbon component that is affected by a potential such that the system switches from being super hydrophilic to super hydrophobic and vice versa, due to the polyvalent interaction between surfactant assemblies and delocalized charges of the insoluble polymer.

In one embodiment of the present invention the insoluble polymer is oxidized conjugate polymer.

In another embodiment of the present invention the oxidized conjugate polymer is polyaniline.

In another embodiment of the present invention the micelle is SDS micelle.

In another embodiment of the present invention the SDS micelle is optionally encapsulated with guest molecule selected from chemical, dyes.

In another embodiment of the present invention the hydrocarbon component is selected from naphthalene or Behera's amine.

In still another embodiment of the present invention the Behera's amine is di-tert-butyl4-amino-4-(3-tert-butoxy-3-oxopropyl) heptanedioate (branched amino alkyl ester).

In yet another embodiment of the present invention A process for the switching of a system from being hydrophilic to hydrophobic and vice versa, which comprises:
  a) Providing a positively charged insoluble conjugated polymer followed by dipping the same in micelle solution to obtain a hydrophobic surface;
  b) Filling the hydrophilic gaps between two micelle chains with a hydrocarbon component to obtain superhydrophobic surface; and
  c) Neutralizing the surface by applying a reduction potential at a voltage range of −0.2 to eject SDS, the aromatic and aliphatic hydrocarbons and thereby to obtain the superhydrophilic surface.

In yet another embodiment of the present invention the provision of positively charged conjugated polymer comprises the oxidation of the polymer at a voltage range of 0.2 to 0.6V.

In yet another embodiment of the present invention the filling of the hydrophilic gaps between two micelle chains comprises dipping the hydrophobic polymer surface in branched alkyl chain hydrocarbons.

In yet another embodiment of the present invention the insoluble polymer is oxidized conjugate polymer.

In yet another embodiment of the present invention the oxidized conjugate polymer is polyaniline.

In yet another embodiment of the present invention the micelle is SDS micelle optionally encapsulated with guest molecule selected from chemical, dyes etc.

In yet another embodiment of the present invention the hydrocarbon component is selected from naphthalene or Behera's amine.

In yet another embodiment of the present invention the Behera's amine is di-tert-butyl 4-amino-4-(3-tert-butoxy-3-oxopropyl)heptanedioate (branched amino alkyl ester).

DESCRIPTION OF DRAWINGS

FIG. 1 depicts a) polyelectrolyte enveloping AAs. b) rigid OCPs disassembling AAs. c) The size of SDS AAs at critical micelle concentration as determined by DLS. d) Unaltered size of SDS AAs upon exposure to NCPs as determined by DLS.

FIG. 2 depicts a) Comparison of percentage of pyrene released upon interaction with OCPs bulk powder and OCPs nanofibers. b) TEM image showing the morphology of OCPs nanofibers. c) BET curve used to calculate the surface area of nano OCPs and d) bulk OCPs.

FIG. 3 depicts a) reversible assembly and disassembly of AAs as a function of applied potential. b) Fluoresence emission spectra of pyrene in an aqueous phase (I372/I384=1.45) upon disassembly by OCPs film. c) Fluoresence emission spectra of pyrene encapsulated in SDS AAs that are formed from the surfactants ejected from the OCPs surface (I372/I384=0.94).

FIG. 4 depicts a) Percentage of pyrene released from SDS AAs upon disassembly induced by OCPs film. b) Percentage release of pyrene as a function of the number of surface regenerations.

FIG. 5 (I) depicts a) Digital image showing water droplet on OCPs surface. b) Image showing water droplet on NCPs surface. c) CA of water droplet on CPs oxidized at 0.2 V and treated with SDS AAs. d) CA of water droplet on CPs oxidized at 0.4 V and treated with SDS AAs. e) CA of water droplet on CPs oxidized at 0.6 V and treated with SDS AAs. f) CA of water droplet on CPs oxidized at 0.6 V, treated with SDS AAs, and subsequently treated with Behera's amine.

FIG. 5 (II) depicts change in water contact angle (°) as a function of applied potential (V), sodium dodecyl sulfate (SDS) and aromatic and aliphatic hydrocarbon. The change in the contact angle with the addition of a micelle (SDS) and a hydrocarbon is represented.

FIG. 6 depicts a) AFM image showing the morphology of OCPs surface b) AFM image of the surface of OCPs treated with SDS AAs. c) AFM image of OCPs treated with SDS AAs, which was then treated with Behera's amine.

FIG. 7 depicts superhydrophilic surface.

FIG. 8 depicts hydrophobic surface.

ABBREVIATIONS

AAs: Amphiphilic Assembly (herein SDS micelle assembly)
CPs: Conjugated polymers
OCPs: Oxidized conjugated polymers
NCPs: Neutral conjugated polymers
CA: Contact angle
DLS: dynamic light scattering
SDS: sodium dodecyl sulfate
CTAB: cetryltrimethylammonium bromide
CMC: critical micelle concentration
AFM: Atomic force microscopy

DETAILED DESCRIPTION OF INVENTION

When water contact angle is >150° and up to 180°, e.g. as in silane material, it is termed as super hydrophobic materials, the contact angel <10° is termed as super hydrophilic materials.

Therefore, the need is for providing a surface with switching between 10 deg and 150 deg ie between superhydrophilic and superhydrophobic for industrial use.

In a preferred embodiment, the invention provides a reversible switching system that comprises a positively charged conjugated polymer; a micelle (SDS) and a hydrocarbon component that is affected by a potential such that the system switches from being super hydrophilic to super hydrophobic and vice versa, due to the polyvalent interaction between surfactant assemblies and delocalized charges of an insoluble polymer.

In another preferred embodiment, the invention provides a process for the switching of a system from being hydrophilic to hydrophobic and vice versa, which comprises:
  a) Providing a positively charged conjugated polymer followed by dipping the same in micelle solution to obtain a hydrophobic surface;
  b) Filling the hydrophilic gaps between two micelle chains with a hydrocarbon component to obtain superhydrophobic surface; and c) Neutralizing the surface by applying a reduction potential so as to eject SDS, the aromatic and aliphatic hydrocarbons and thereby to obtain the hydrophilic surface.

Providing positively charged conjugated polymer comprises the oxidation of the polymer at a voltage range of 0.2 to 0.6V.

Filling the hydrophilic gaps between two micelle chains comprises dipping the hydrophobic polymer surface in branched alkyl chain hydrocarbons.

To accomplish the objective of the invention, a charged polymer was taken and placed a water drop on it, which sticks at an angle of 6° (FIG. 7). The polymer is dipped in a micelle, preferably SDS to obtain a contact angle of 100° (FIG. 8). The increase is because the anionic head group of the SDS sticks to the positively charged surface. This increase in contact angle indicate the conversion of the hydrophilic surface to hydrophobic. However, the inventors have observed certain gaps, between two SDS chains which are hydrophilic. In order to make this surface super hydrophobic, the gaps must be filled with hydrophobic components.

The process of the invention accomplishes with the filling of gaps between two SDS chains with a hydrocarbon, so as to increase the surface hydrophobicity up to 120°. The inventors surprisingly found that by filling the gaps with aliphatic branched hydrophobic molecule the contact angle can be further increased up to 155°. Then the polymer can be neutralized by applying a reduction potential so as to eject SDS, the aromatic and aliphatic hydrocarbons and to obtain the hydrophilic surface. This process can be repeated; hence the surface hydrophobicity and hydrophilicity can reversibly be obtained.

Figure 5:
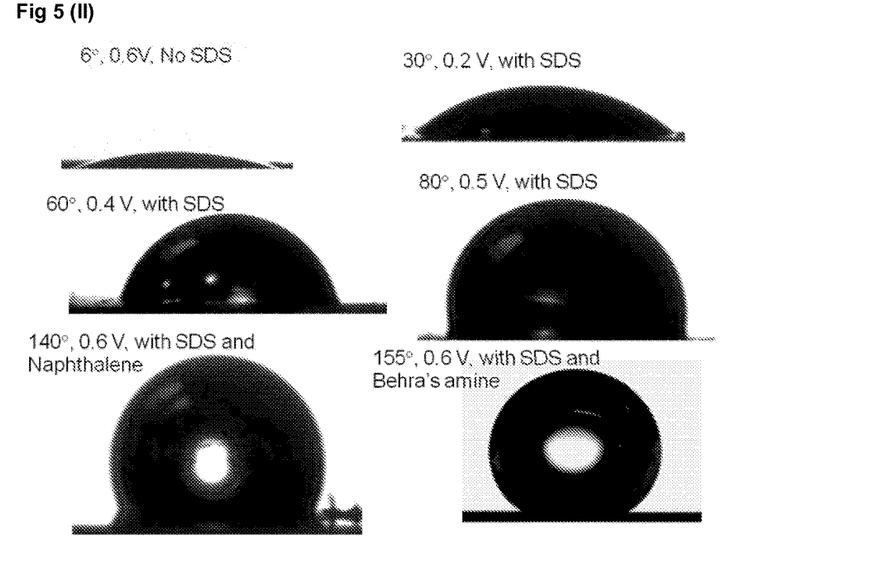

With reference to FIG. 5, as synthesized polymer exposed to water drop would show a contact angle of 6°. A polymer oxidized at 0.2 V and dipped in SDS micelles show 30°. Polymer oxidized at 0.4 V and dipped in SDS would show 60°. Polymer oxidized at 0.5 V and dipped in SDS would show 80°. Polymer oxidized at 0.6 V and dipped in SDS would show 100°. Polymer oxidized at 0.6 V and dipped in SDS and then dipped in aromatic hydrocarbon naphthalene shows 140°. Polymer oxidized at 0.6 V and dipped in SDS and then dipped in branched alkyl chain hydrocarbon shows 155°.

Thus in accordance with the objectives of the invention, the invention provides electropolymerisation of a monomer on its surface and keep the polymer in it's charged state. This surface is hydrophilic due to the presence of positive charges. Then the electrode is dipped in a solution of negatively charged amphiphilic assemblies, which get adsorbed on the polymer surface and convert the polymer surface to hydrophobic.

In a preferred embodiment of the invention, the polymer is insoluble oxidized—conjugated polymer, more preferably polyaniline. The micelle is SDS and the hydrocarbon component is naphthalene or Behera's amine, wherein Behera's amine is di-tert-butyl 4-amino-4-(3-tert-butoxy-3-oxopropyl)heptanedioate (branched amino alkyl ester).

To accomplish reversible assembly and disassembly of AAs, the polymer needs to be coated on substrate and charge regeneration has to be carried out. Accordingly, polyaniline was electrodeposited on Pt foil by applying a constant potential of 0.6 V vs Ag/AgCl. At this potential, the polymer bears delocalized positive charges; hence it is a film version of OCPs. The polymer film was then dipped in a solution containing SDS AAs, and the size of the assemblies in an aliquot was monitored by DLS. The disassembly of AAs was confirmed by the disappearance of a peak corresponding to 6 nm, and then a reduction potential of −0.2 V was applied with respect to a quasi-reversible Pt reference electrode. This potential is suffice to convert OCPs to NCPs that in turn would result in the ejection of SDS amphiphiles into the solution from the polymer surface. Now, the concentration of SDS in the solution would reach the critical micelle concentration (CMC), if all the SDS molecules that were bound to the OCPs surface were released. To check the formation of the AAs, aliquot withdrawn from the solution was subjected to DLS analysis and noted that a peak corresponding to 6 nm in the DLS histogram indicating the formation of SDS AAs. The cartoon in FIG. 3a depicts the whole process of assembly and disassembly as a function of applied potential.

In yet another embodiment, the invention provides the release and encapsulation of guest molecules upon disassembly and assembly of SDS AAs. Accordingly, OCPs film coated electrode was immersed in pyrene encapsulated SDS AAs solution and left quiescent. Emission spectrum of the solution was recorded to determine the environment of pyrene. The $I_{372}/I_{384}$ was found to be 1.45, which indicates the disassembly of SDS AAs and the presence of pyrene in an aqueous environment (FIG. 3b), and then the OCPs film was reduced to NCPs, which ejects the SDS surfactants into the solution. Upon reaching the CMC, the SDS AAs are likely to sequester the pyrene in the solution. If that occurs, the $I_{372}/I_{384}$ of pyrene should indicate the presence of the guest molecule in a hydrophobic environment. The intensity of $I_{372}/I_{384}$ of 0.94, which confirms the presence of pyrene in a hydrophobic environment (FIG. 3c).

With these experiments, the inventors have demonstrated the reversible assembly and disassembly of AAs and corresponding encapsulation and release of guest molecules.

The release of guest molecules by reusing the OCPs surface and the release of pyrene from AAs are also demonstrated in the present invention. The change in $I_{372}/I_{384}$ confirms the disassembly and concomitant release of the guest molecules from the AAs upon interaction with OCPs coated substrate. UV-vis absorption spectroscopy was used to quantify the released pyrene, and it was found to be 93% (FIG. 4a). The polymer coated Pt foil was subsequently reduced at −0.2 V to convert the polymer to its neutral state (NCPs), which is not capable of inducing disassembly. Then the polymer film was reoxidized at 0.6 V and utilized for further disassembly of AAs. The experiment and the analysis were repeated to elucidate the films reusability. Thus the invention is made it possible to reuse the electrode over a period of five days and over ten cycles for the purpose of disassembling and releasing the guest molecules, after which the quantity of the release decreased, possibly owing to the degradation of the polymer (FIG. 4b). The CTAB AAs used for control experiments did not disassemble, which further confirms the methods specificity.

AAs assembly and disassembly, release of payload, and reuse of OCPs surface for repetitive disassembly have been unambiguously proven by the present invention.

The present invention further demonstrates the change in surface properties of OCPs upon interaction with AAs. The OCPs surface is likely to be hydrophilic due to the presence of positive charges on the polymer. It is necessary to recall that the OCPs surface was prepared by oxidizing the polymer at 0.6 V vs Ag/AgCl, wherein the polymer is likely to have a maximum number of positive charges. On the other hand, NCPs have no positive charges because they are prepared by applying a reduction potential of −0.2 V vs Ag/AgCl to OCPs. One of the attractive features of CPs is it provides a handle to control the number of positive charges by varying the applied potential. Thus, by controlling the positive charges on the polymer, one can control the number of anions that bind with the polymer surface. The number of anionic surfactants that bind with the polymer is a function of the number of positive charges generated by the applied potential. Considering this, it is reasonable to anticipate that the hydrophobicity of the surface scales as a function of the amount of surfactant binding on the polymer surface. To prove this, the inventors have studied the contact angle (CA) of a drop of water on the polymer film surface, which gives a measure of surface hydrophobicity. The CA on the OCPs surface was found to be 6°, a value typical of hydrophilic surfaces (FIG. 5a). Also, the CA of NCPs, which was found to be about 6° (FIG. 5b), and then the oxidation potential of 0.2 V was applied to NCPs which generates positive charges on the NCPs surface. After that, the film was immersed in SDS AAs, and then the CA of water drop was measured. The CA for this surface was found to be 30° (FIG. 5c). By repeating the same procedure, but by applying a potential of 0.4 V, a surface with CA of 60° was obtained (FIG. 5d). This was further increased to 80° by applying 0.5 V to NCPs and dipping in SDS AAs. By applying 0.6 V and treating the film with SDS AAs a contact angle of 100° was achieved (FIG. 5e). Upon interaction of SDS AAs with OCPs surface, the positive charges are neutralized by the negative charges of the SDS surfactants and concurrently the alkyl chains protrude from the polymer surface. This leads to low surface energy and results in an increase in hydrophobicity. It is enticing to increase the CA to ≥150° (superhydrophobic surface). OCPs surfaces prepared by applying potentials above 0.6 V and dipping in SDS AAs did not increase the CA beyond 100°, due to the formation of fully oxidized polyaniline (OCPs) at 0.6 V. Surprisingly, the inventors have found that the CA can be increased by filling the hydrophilic voids between the SDS molecules. This was achieved by immersing a OCPs film with CA of 100° in a solution containing di-tert-butyl 4-amino-4-(3-tert-butoxy-3-oxopropyl)heptanedioate (branched amino alkyl ester or Behera's amine. The branched structure was chosen to impart hydrophobicity to the hydrophilic voids between the SDS molecules. The CA increased from 100° to 155° (FIG. 5f). The OCPs treated with branched amino alkyl ester alone showed a CA of 50°, which is 105° less than that observed for OCPs treated with SDS and Behera's amine. Furthermore, the CA was found to be 100°, if the acid analogue of Behera's amine was used. The carboxylic acid and amine terminals cannot impart hydrophobicity to the voids, hence the CA remain close to OCPs surface treated with SDS AAs. These experiments confirm that the filling of the hydrophilic voids between the alkyl chains of SDS molecules protruding from the OCPs surface as a means to increase hydrophobicity. Often, hydrophobicity enhancement has been attributed to increase in the surface roughness, hence it is necessary to test any microscopic changes on the polymer surface upon interaction with SDS AAs. Atomic force microscopy (AFM) imaging of OCPs (FIG. 6a), OCPs treated with SDS AAs (FIG. 6b), and OCPs treated with SDS AAs and Behera's amine (FIG. 6c) was carried out to find out any changes in the morphology of the surfaces. No discernible changes in the morphology were observed in AFM images confirming the change in surface hydrophobicity is due to the noncovalent attachment of SDS surfactants and Behera's amine.

Till date, CPs based superhydrophobic surfaces have been prepared using tedious synthesis and patterning procedures. However, the invention demonstrates that the surface wettability of CPs can be controlled at ease by varying the applied potential and dipping in SDS AAs.

In a nut shell, the present invention utilized a charge bearing, insoluble, and rigid conjugated polymer to disassemble AAs. Furthermore, the disassembly and assembly of AAs were accomplished by switching CPs between its charged and neutral states. The rate of disassembly was controlled by modulating the morphology of the CPs. During the disassembly of AAs, the encapsulated cargo can be released, and the process can be repeated several times by regenerating the charges on the CPs. Upon disassembly, the amphiphiles which were constituents of AAs are bound to the OCPs that impart hydrophobicity to the polymer. By controlling the charge on the polymer and subsequently dipping in AAs, the surface hydrophobicity was varied between hydrophilic to hydrophobic wettings.

The following examples, which include preferred embodiments, will serve to illustrate the practice of this invention, it being understood that the particulars shown are by way of example and for purpose of illustrative discussion of preferred embodiments of the invention.

EXAMPLES

Materials and Methods

The analytical grade chemicals aniline, ammonium persulfate, sodium dodecyl sulfate (ACS reagent), cetyl trimethyl ammonium bromide, and pyrene were purchased from Sigma-Aldrich and used as received. Reagent grade HCl and isopropyl alcohol were purchased from Loba Chemie. The deionized water was collected from Millipore Q Gard water purifier and further purified by filtering through a 30 nm polycarbonate membrane purchased from SPI pore. The 30 nm pore membrane was mounted on a stainless steel filter holder, which was then fitted in plastic syringe. A CH Instruments 600D potentiostat/galvanostat was used for electrochemical measurements and electropolymerization of aniline. The working and counter electrodes were fabricated using Pt foil (99.9% purity) purchased from Arora Matthey Ltd. UV-vis spectra were recorded with a Jasco U Best V-570 UV-vis spectrophotometer. Fluorescence spectra were recorded with a Cary Eclipse Fluorescence spectrophotometer. The particle size of the assemblies was recorded with a Brookhaven 90 plus Particle Size Analyzer. AFM images were recorded with MM AFM LN supplied by Veeco Multimode in taping mode. Gold coated silicon substrates were used as substrates for AFM imaging. TEM imaging was done with a Jeol 1200 EX transmission electron microscope. The carbon coated copper grids (400 grids) were obtained from Ted Pella. Water drop contact angles were measured in a Digidrop Contact Angle Meter.

Example 1

Polyaniline of ~1 micron thickness was chosen as the polymer surface. This was synthesized on top of a gold coated plastic substrate. The water contact angle was found to be 6°. To modify the surface, SDS micelles were chosen (concentration $10^{-3}$ M). The polymer was oxidized at various potentials and dipped in $10^{-3}$ M SDS. This gave rise to change in surface hydrophobicity. To further enhance the surface hydrophobicity, the polymer surface was treated with 0.01 M Behera's amine.

Example 2

Synthesis of Polymer

Oxidized conducting polymer (OCPs), polyaniline, was synthesized by chemical polymerization of aniline using ammonium persulfate (APS) as initiator. For this purpose 100 mM aniline was dissolved in 1 M HCl solution (100 ml), and subsequently 100 mM APS (ammonium persulfate) was added. The reaction was allowed to proceed for 24 h at 25° C., and then the reaction was stopped by filtering the polymer using 200 nm pore nylon membrane, followed by washing the initiator and unreacted monomer. Polyaniline nanofibers were synthesized by following the interfacial polymerization procedure. Alternately, aniline (100 mM) was dissolved in chloroform (100 ml) and allowed to stand quiescent in a sample vial. To that solution, 100 mM APS dissolved in 1 M HCl (100 ml) was added. After five minutes, the polyaniline formation at the chloroform water interface is visible. The reaction was allowed to proceed for 24 h at 25° C., and then the fibers were collected by filtration in a 200 nm pore nylon membrane. The polymer nanofibers were then washed with copious amounts of water to remove unreacted monomer and initiator.

To prepare NCPs (Neutral conjugated polymers), 200 mg of OCPs was stirred in 25 mL of hydrazine hydrate for 12 h at 25° C. Hydrazine hydrate reduces the OCPs to NCPs. The NCPs were then washed thoroughly with water. Similarly, NCPs nanofibers were prepared by treating the OCPs nanofibers with hydrazine hydrate.

Example 3

Preparation of Pyrene Encapsulated Micelles

The micelles were prepared by dissolving 6 mM SDS (Sodium dodecyl sulfate), in deionized water (100 ml), which was prefiltered through 30 nm polycarbonate membrane. The pyrene encapsulation was carried out by following the reported procedure, and the concentration of pyrene was maintained at $10^{-6}$ M for all the experiments. Pyrene exhibits multiple emission peaks, and the ratio of the peak intensity at 372 nm (I372) to that at 384 nm (I384) provides information about the environment of the probe. For this study, pyrene was entrapped in SDS AAs, and I372/I384 was determined to be 0.97, which corresponds to the presence of pyrene in a hydrophobic environment.

To study the disassembly and release of guest molecules, 100 mg of OCPs was added to the SDS AAs solution, and the mixture was allowed to stand quiescent. For the DLS measurement, the supernatant liquid was taken out using a syringe and filtered through a 600 nm polycarbonate membrane (SPI pore). The size of the assemblies is of 6 nm, which is 100 times smaller than the pores (600 nm) of the membrane the size of the assemblies is not affected by this filtration step as evidenced from the DLS data. For UV-vis spectra and fluorescence emission spectra, the supernatant solution was taken out without disturbing the underlying insoluble polymer (either OCPs or NCPs). The TEM images of the polyaniline were obtained by dropping the sample, which was dispersed in isopropyl alcohol on a carbon coated copper grid (400 grid). OCPs/polyaniline films were prepared by electropolymerization of 0.1 M aniline dissolved in 0.1 M HCl by applying a constant potential of 0.6 V vs Ag/AgCl reference electrode. The working (geometric area—1 cm2) and counter electrodes (geometric area—2 cm2) were Pt foils.

For reversible disassembly and assembly studies, the OCPs film coated electrode was dipped in pyrene encapsulated SDS AAs. After 3 h, an aliquot was withdrawn and the emission spectrum was recorded. The solution was poured into the solution with the OCPs coated electrode. A potential of −0.2 V was applied to eject the SDS unimers from the OCPs surface into the solution. The aliquot was withdrawn to record the emission spectrum to show the formation of SDS AAs ejected from the OCPs that eventually encapsulated the pyrene in the water.

Example 4

Disassembly of AAs

Sodium dodecyl sulfate (SDS) is chosen as the amphiphile because of the presence of anionic moieties which can, therefore, interact with the positive charge bearing OCPs.

The OCPs induced disassembly process was first studied using dynamic light scattering (DLS). The aggregate size of AAs prepared using 6 mM SDS solution was found to be 6 nm (FIG. 1c). In order to monitor the disassembly of AAs, 100 mg of dry oxidized polyaniline (OCPs) powder was added to 5 mL of SDS solution. Upon addition of OCPs, the peak corresponding to 6 nm disappeared, which indicates the disassembly of AAs. If the disassembly is due to the attractive interaction between the positive charges of OCPs and negative charges of the SDS AAs, the assemblies should not disaggregate in the presence of neutral conducting polymers (NCPs). To examine this possibility, NCPs was added to the AAs solution, and the assembly size was determined by DLS. The size of the assemblies was found to be 6 nm and remained constant over a period of 48 h (FIG. 1d). This confirms that the disassembly process is exclusively due to the electrostatic attractive interaction between OCPs and SDS AAs.

To further validate the above observation, cationic micelle, cetyltrimethylammonium bromide (CTAB) was allowed to interact with OCPs, and the assembly size was monitored. In this experiment, both the AAs and the OCPs have positive charges, hence, the electrostatic attraction is unlikely. Indeed, the DLS measurement indicated that the 6 nm CTAB assemblies did not undergo any alteration. Similarly, the CTAB micelle size was unaffected while it was exposed to NCPs, which indicates that the assembly process is solely due to the polyvalent attractive interaction between negatively charged AAs and positively charged rigid polymer Example 5

Pyrene Encapsulated AAs

The disassembly and concomitant release of sequestered guest molecules were determined as a function of time using pyrene, which exhibits multiple emission peaks, and the ratio of the peak intensity at 372 nm (I372) to that at 384 nm (I384) provides information about the environment of the probe.

For this study, pyrene was entrapped in SDS AAs, and I372/I384 was determined to be 0.97, which corresponds to the presence of pyrene in a hydrophobic environment. Upon addition of OCPs to the pyrene sequestered SDS AAs the I372/I384 started increasing from 0.97 and reached a value of 1.5 in 60 min, which indicated that the new environment faced by pyrene was hydrophilic. This change in the environment of pyrene is due to the disassembly of SDS AAs and concomitant release of cloistered pyrene into water.

The same experiment was carried out using NCPs, and no alteration in I372/I384 of pyrene was observed, which corroborates the fact that the assemblies remain intact in the presence of NCPs.

UV-vis spectroscopy was used to quantify the amount of pyrene released due to the disassembly of the SDS AAs upon interaction with OCPs. The gradual decrease in the absorption intensity at 338 nm indicates the release of pyrene from SDS AAs into water. About 96% of pyrene was released upon the disassembly of AAs, and the release profile is shown in FIG. 2a. On the other hand, the unaltered UV-vis spectral features of pyrene indicate that the SDS AAs did not disassemble, and the guest molecules were not released in the presence of NCPs. From these experiments, it is apparent that the AAs disassemble only when involved in electrostatic attraction with insoluble and rigid OCPs surface. The release percentage value is also indicative of the fact that the released pyrene is essentially in the aqueous environment and not entrapped in the amphiphile modified CPs. This further proves the absence of any reformed assemblies comprising OCPs and amphiphiles. If it is a surface bound phenomenon, the release kinetics should vary with changes in the OCPs surface morphology. In order to verify this, OCPs nanofibers were synthesized by interfacial polymerization, having a diameter of about 50 nm (FIG. 2b).

Contrary to this, polyaniline synthesized by conventional solution polymerization yielded large quantities of bulk powder. The nanofibers synthesized by interfacial polymerization were then added to the SDS AAs, and the dimension of the assemblies was determined. The 6 nm SDS AAs were disassembled as can be seen from the DLS correlation data. To study the rate of the release, these nanoscopic fibers were added to pyrene encapsulated SDS AAs solution and release of pyrene was monitored as a function of time.

The disassembly and concomitant release was completed in 15 min, which is faster by about three times as compared to the bulk OCPs release (FIG. 2a). Usually, change in morphology from bulk to nano would increase the surface area significantly.

Nanofibers induced guest molecules release should have been much faster than that observed in this study. To further investigate this, surface area of bulk OCPs and nano OCPs were determined by BET surface area measurements and found that the surface area of nano OCPs and bulk OCPs was found to be 45 m2/g (FIG. 2c) and 20 m2/g (FIG. 2d), respectively, which suggests the possibility of the presence of nanofibers in bulk OCPs. Indeed, meticulous TEM imaging of bulk OCPs showed the presence of nanofibers. It has also been reported that the polyaniline synthesized by conventional methods did contain nanofibers along with bulk powder. Consolidating the results of surface area measurements and guest molecule release studies, the ~65% decrease in release time is a result of ~50% increase in surface area of the nanofibers.

From the foregoing, it is evident that the disassembly and release of payload occurs only when electrostatic attraction between rigid OCPs and AAs is in operation. Thus, the mere presence of CPs is not adequate to trigger disassembly and release of guest molecules. This essentially means that the CPs can be placed at a location passively and activated by generating positive charges on the CPs whenever desired.

ADVANTAGES OF THE PRESENT INVENTION

The present invention is very simple process by applying a small potential to change wettability from super hydrophilic top super hydrophobic in between.

The invention claimed is:

1. A reversible switching system comprising
a positively charged insoluble conjugated polymer;
a micelle and a hydrocarbon component that is affected by a potential such that the system switches from being super hydrophilic to super hydrophobic and vice versa, due to the polyvalent interaction between surfactant assemblies and delocalized charges of the insoluble polymer,
wherein the micelle is a sodium dodecyl sulphate (SDS) micelle, and
wherein the hydrocarbon component is selected from naphthalene or a branched amino alkyl ester.

2. The reversible switching system according to claim 1, wherein the positively charged insoluble conjugated polymer is an oxidized conjugate polymer.

3. The reversible switching system according to claim 2, wherein the oxidized conjugate polymer is polyaniline.

4. The reversible switching system according to claim 1, wherein the SDS micelle is encapsulated with a guest molecule.

5. The reversible switching system according to claim 1, wherein the branched amino alkyl ester is Behera's amine also known as di-tert-butyl 4-amino-4-(3-tert-butoxy-3-oxopropyl) heptanedioate.

6. A process for the switching of a system from being hydrophilic to hydrophobic and vice versa using the reversible switching system of claim 1, comprising:
a) Providing the positively charged insoluble conjugated polymer followed by dipping the positively charged insoluble conjugated polymer in the micelle solution to obtain a hydrophobic surface;
b) Filling the hydrophilic gaps between two micelle chains with the hydrocarbon component to obtain a superhydrophobic surface; and
c) Neutralizing the superhydrophobic surface by applying a reduction potential at a voltage range of from −0.4 V to −0.2 V to eject SDS, aromatic and aliphatic hydrocarbons and, thereby to obtain a superhydrophilic surface.

7. The process according to claim 6, wherein the provision of the positively charged insoluble conjugated polymer comprises the oxidation of the polymer at a voltage range from 0.2 to 0.6V.

8. The process according to claim 6, wherein the filling of the hydrophilic gaps between two micelle chains comprises dipping the hydrophobic polymer surface in the hydrocarbon component.

9. The process according to claim 6, wherein the insoluble polymer is an oxidized conjugate polymer.

10. The process according to claim 9, wherein the oxidized conjugate polymer is polyaniline.

11. The process according to claim 6, wherein the micelle is an SDS micelle optionally encapsulated with a guest molecule.

12. The process according to claim 6, wherein the branched amino alkyl ester is Behera's amine also known as di-tert-butyl 4-amino-4-(3-tert-butoxy-3-oxopropyl) heptanedioate.

13. The reversible switching system according to claim 4, wherein the guest molecule is a chemical or a dye.

* * * * *